No. 776,912. PATENTED DEC. 6, 1904.
P. E. & C. F. HOWARD.
ANIMAL FEEDER.
APPLICATION FILED APR. 30, 1904.
NO MODEL.
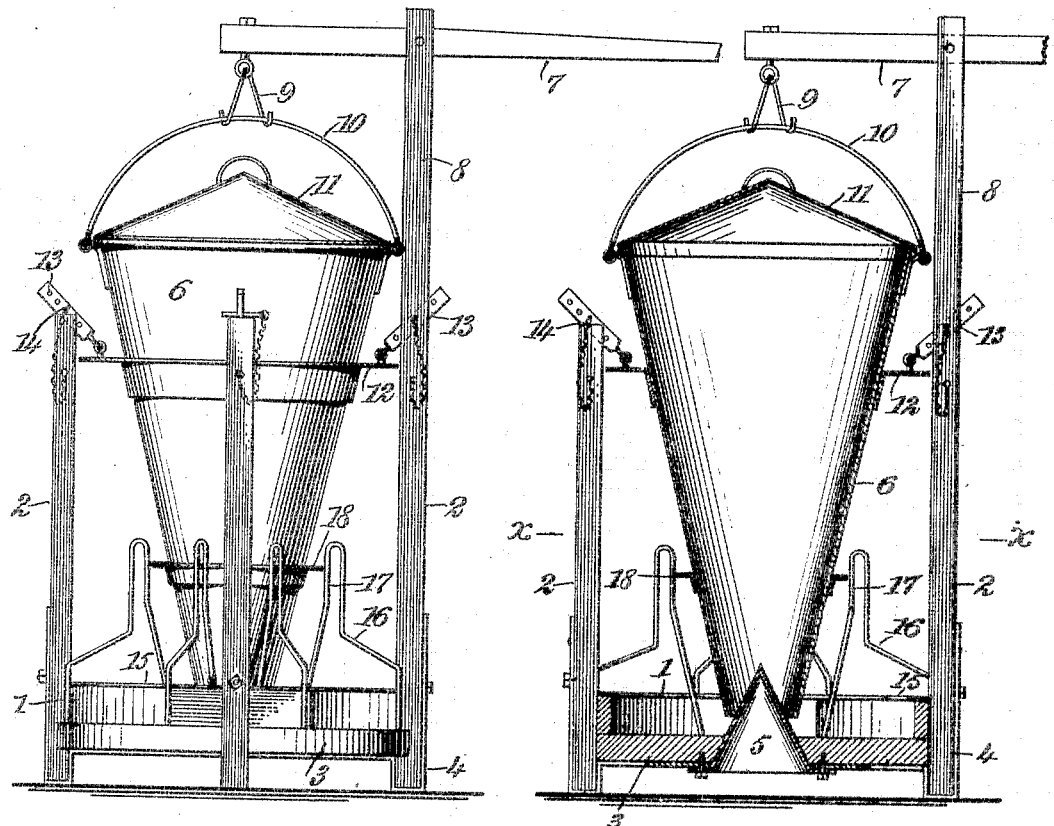
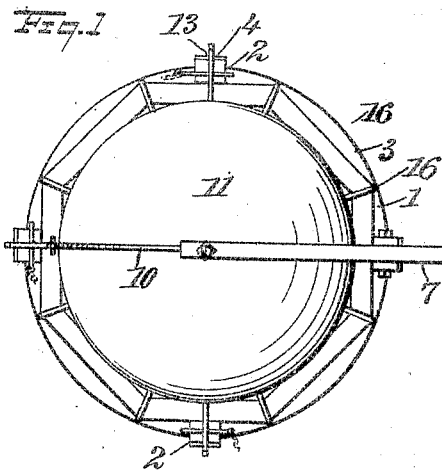
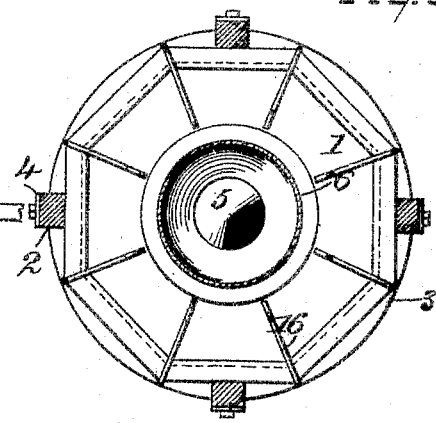
WITNESSES:
INVENTORS
Perkins E. Howard
Corwin F. Howard
BY
ATTORNEYS No. 776,912. Patented December 6, 1904.

UNITED STATES PATENT OFFICE.

PERKINS E. HOWARD, OF HITCHCOCK, OKLAHOMA TERRITORY, AND CORWIN F. HOWARD, OF DEEPWATER, MISSOURI.

ANIMAL-FEEDER.

SPECIFICATION forming part of Letters Patent No. 776,912, dated December 6, 1904.

Application filed April 30, 1904. Serial No. 205,678. (No model.)

*To all whom it may concern:*

Be it known that we, PERKINS E. HOWARD, a resident of Hitchcock, in the county of Blaine and Territory of Oklahoma, and CORWIN F. HOWARD, a resident of Deepwater, in the county of Henry and State of Missouri, both citizens of the United States, have invented a new and Improved Animal-Feeder, of which the following is a full, clear, and exact description.

This invention relates to improvements in devices for supplying feed to animals, particularly hogs, an object being to provide a feeder adapted to supply shelled corn, bran, meal, or other food to a trough from which animals feed and so arranged that the flow of meal to the trough may be adjusted for the food it contains.

We will describe an animal-feeder embodying our invention and then point out the novel features in the appended claims.

Reference is to be had to the accompanying drawings, forming a part of this specification, in which similar characters of reference indicate corresponding parts in all the figures.

Figure 1 is a side elevation of an animal-feeder embodying our invention. Fig. 2 is a sectional elevation thereof. Fig. 3 is a top plan view, and Fig. 4 is a section on the line *x x* of Fig. 2.

The feeder comprises a trough 1, which may be made of any suitable material, such as wood or metal, and, as here shown, the side walls of this trough are of octagonal shape; but the same may be circular without departing from the spirit of our invention. The trough is supported by four posts 2. The bottom 3 of the trough is provided with recesses which receive the lower portions of the posts, and metal straps 4 are secured to the bottom 3 and pass underneath the posts and then up the outer sides thereof, to which they are bolted. Arranged at the center of the trough and extended upward therefrom is a conical distributer 5, which projects into the lower open end of a conical feed-container 6, consisting of metal or other suitable material. This container 6 is suspended from a lever 7, pivoted to an upward extension 8 of one of the posts 2 by means of a hook 9, engaging with a bail 10, attached to the container, and the container is provided with a cover 11. Near the upper end of the container is an outwardly-extended annular flange 12, to which adjusting-plates 13 are pivoted. These adjusting-plates are provided each with a plurality of perforations through which holding-pins 14 pass, these pins engaging on the tops of the short posts; but the plate 13, passing through the post having the extension 8, has its pin extended through perforations in the post. These plates pass through slots in the posts, and by their means the container may be adjusted and held so as to provide the desired space or opening between the lower end of the container and the distributer 5. Of course the container will be raised and lowered by means of the lever 7. On the upper edge of the trough is an inwardly-extended flange 15, which will prevent the feed from slopping over. The trough is divided into sections by means of partition-rods 16. The several partition-rods have their inner ends extended into the bottom 3 and suitably secured, and certain of the rods have their outer ends also extended into the bottom. The rods at their inner portions extend substantially parallel with the wall of the container 6 for a portion of their length; but the upper portions 17 are perpendicular and are designed to engage with an annular flange 18, secured to the container, so that this flange 18 by engaging with the portions 17 will at all times maintain the container in a central position. As the outer portions of the rods 16 extend to the outer side of the trough, it is evident that the trough will be spaced into suitable sections, each section designed to receive the head of one animal.

In the operation the material placed in the container 6 will flow through the opening between the lower end of the container and distributer 5 and be distributed equally to all parts of the trough, and, as before stated, the container may be regulated with relation to the spreader to adapt it for the different forms of food. For instance, when shelled corn is used a greater opening is required than in the case of meal or the like, and therefore the container should be raised when corn is used. By making the container conical with the smaller end downward it is obvious that all of the feed will be gradually discharged.

Having thus described our invention, we claim as new and desire to secure by Letters Patent—

1. An animal-feeder comprising posts, a trough supported by said posts, an upwardly-extended conical spreader in said trough, a conical feed-container having an open lower end into which the spreader extends, a lever having connection with the container and mounted to swing on one of the posts, and partitions for the trough.

2. An animal-feeder comprising posts, a trough supported at the lower portion of the posts, a conical spreader extended upward from the center of the trough, a conical feed-container into the open end of which the spreader extends, adjustable plates having pivotal connection with the container and having swinging relation with the posts, an annular flange near the lower end of the container, and partition-rods for the trough having perpendicular portions for engaging with said flange.

3. An animal-feeder comprising posts, a trough supported by said posts, a conical spreader extended upward from the center of said trough, a conical feed-container into the open lower end of which the spreader extends, a flange surrounding the upper portion of the container, plates pivoted to said flange, each having a series of perforations, pins for passing through the perforations of the plates and engaging with the posts, a lever mounted to swing on one of the posts, a hook on said lever, a bail on the container for engaging with the hook, and partitions for the trough.

4. An animal-feeder comprising posts, a trough, metal straps connected to the bottom of the trough and passing underneath and along the outer sides of the posts and secured thereto, a spreader at the center of the trough and extended upward, a feed-container into the open lower end of which the spreader passes, partition-rods having their ends engaged with the bottom of the trough, an annular flange on the container for engaging with the inner portions of the rods, and means for suspending and vertically adjusting the container.

In testimony whereof we have signed our names to this specification in the presence of two subscribing witnesses.

PERKINS E. HOWARD.
CORWIN F. HOWARD.

Witnesses to the signature of Perkins E. Howard:
A. E. BLANC,
J. E. WELTY.

Witnesses to the signature of Corwin F. Howard:
E. A. WIDMAN,
J. M. PIGG.